United States Patent
Mravca et al.

(10) Patent No.: US 11,122,408 B1
(45) Date of Patent: Sep. 14, 2021

(54) SYSTEM FOR MONITORING AUDIO QUALITY OF CLUSTERED WIRELESS DEVICES

(71) Applicant: Wireless Metrix, Sunnyvale, CA (US)

(72) Inventors: Jim Mravca, Sunnyvale, CA (US); Bruce Morley, Sunnyvale, CA (US); Malcolm Caraballo, Fremont, CA (US)

(73) Assignee: Wireless Metrix, Sunnyvale, CA (US)

( * ) Notice: Subject to any disclaimer, the term of this patent is extended or adjusted under 35 U.S.C. 154(b) by 0 days.

(21) Appl. No.: 16/866,035

(22) Filed: May 4, 2020

(51) Int. Cl.
  *H04W 4/80* (2018.01)
  *H04B 17/318* (2015.01)
  *H04W 52/38* (2009.01)

(52) U.S. Cl.
  CPC ............ *H04W 4/80* (2018.02); *H04B 17/318* (2015.01); *H04W 52/383* (2013.01)

(58) Field of Classification Search
  CPC ..... H04W 4/80; H04W 52/383; H04W 24/00; H04W 24/02; H04B 17/318; H04B 17/104; H04B 17/15; H04B 17/29; H04M 3/2227
  See application file for complete search history.

(56) References Cited

U.S. PATENT DOCUMENTS

| | | | | |
|---|---|---|---|---|
| 8,547,125 B2* | 10/2013 | Morita | ............. | G01R 31/31907 324/750.3 |
| 2005/0182583 A1* | 8/2005 | Miyazaki | ......... | G01R 31/31907 702/117 |
| 2011/0057673 A1* | 3/2011 | Iwamoto | .......... | G01R 31/31726 324/750.3 |
| 2011/0060933 A1* | 3/2011 | Iwamoto | .......... | G01R 31/31907 713/400 |

* cited by examiner

*Primary Examiner* — Devan A Sandiford
(74) *Attorney, Agent, or Firm* — Kali Law Group, P.C.

(57) ABSTRACT

Systems for monitoring audio quality of clustered devices are presented including: a number of wireless communication devices that are physically clustered; a number of audio interface modules (AIM) each electronically paired with each of the number of wireless communication devices to form an AIM/device pair, where the number of AIMs each receives and transmits wireless audio transmissions from each of the paired number of wireless communication devices; a data bus hub electronically coupled with the number of AIMs; and an electronic computing device for receiving and analyzing data associated with the wireless audio transmissions. In some embodiments, wireless audio transmissions are either a narrowband transmission or a wideband transmission. In some embodiments, the wideband transmission is a WiFi audio transmission and the narrowband transmission is a BLUETOOTH® transmission.

23 Claims, 7 Drawing Sheets

SYSTEM FOR MONITORING AUDIO QUALITY OF CLUSTERED WIRELESS DEVICES

FIELD OF INVENTION

Embodiments of the present invention relate generally to measuring audio quality of clustered cellular phones that utilize wireless audio devices. In particular, embodiments of the present invention relate to a distributed system which allows the measurement of audio quality via a wireless link to a cell phone.

BACKGROUND

Audio quality measurement systems are well known in the art. In a typical audio quality measurement system, a test measurement device is connected via an audio cable to the device under test (DUT). Each DUT, since it is hard wired, does not suffer from any local wireless interference issues when testing numerous devices in close proximity. The typical system architecture in these circumstances are hard wired from each cellphone/DUT to a single test hub that contains the audio test circuits as well as other interface circuitry. In addition to receiving and sending audio signals through an audio cable the central hub can serve multiple other purposes such as supplying power, collecting and sending control and diagnostic data to the DUT. In some examples, these conventional test hubs can also include wireless control circuitry (i.e. BLUETOOTH®) to control the DUT. This type of cell phone control using a low duty cycle communications BLUETOOTH® is common and does not affect the audio quality measurement since the audio is hard wired (i.e. not transmitted via BLUETOOTH®).

Now that DUTs are available (i.e. iPhones and more to come) that do not contain a way to simultaneously access the wired audio signal and the corresponding diagnostic data, a major setback to the conventional test hub architecture exists. Accessing the Audio or the Diagnostic Data separately has little value. Collecting them simultaneously is important because it allows one to correlate the Audio Quality with the Network Performance.

Figure 1:
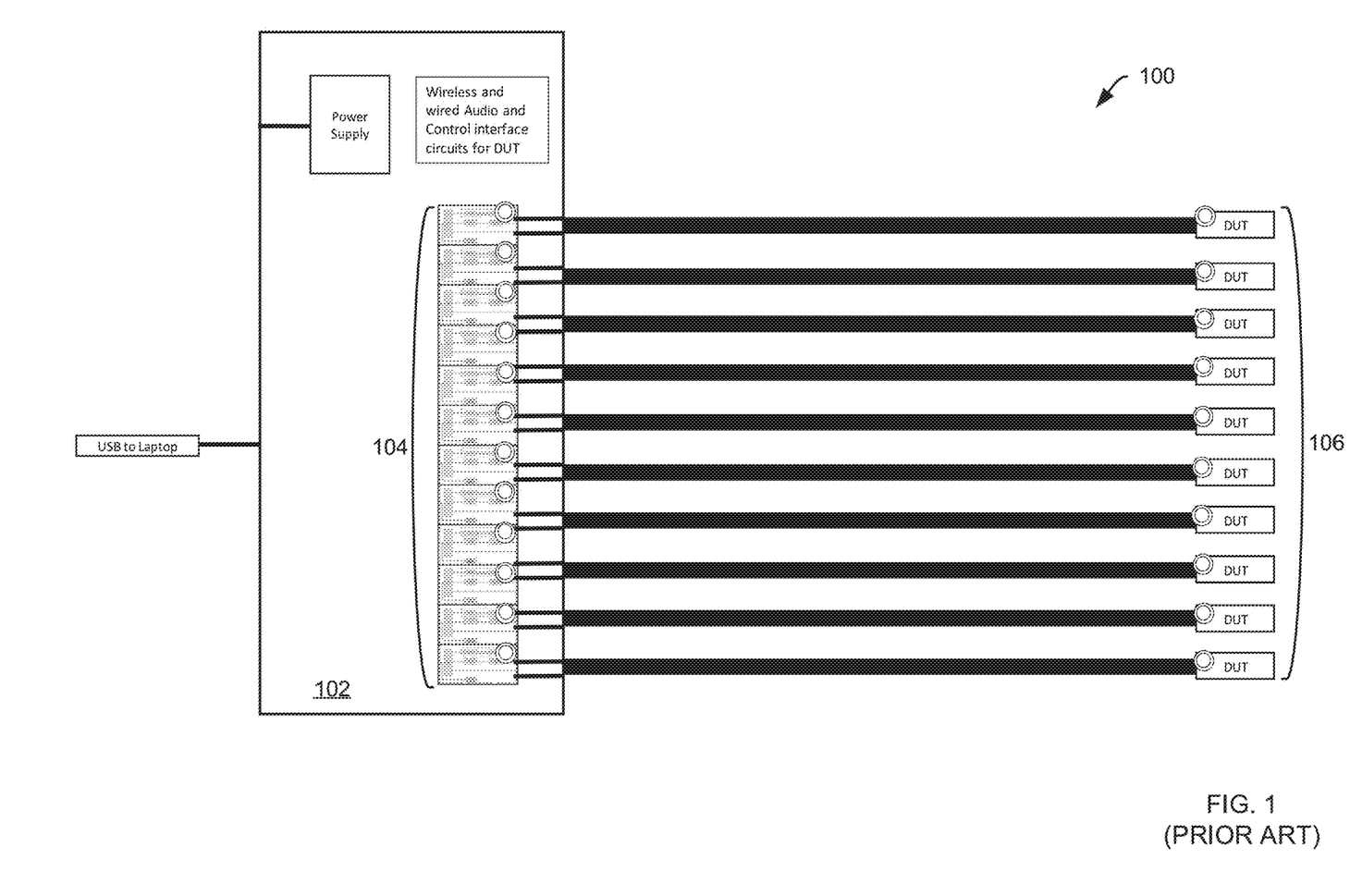
FIG. 1 is a prior art representation of a conventional wireless testing system.

FIG. 1 is a prior art representation of a conventional wireless testing system 100. Using conventional architectures require that the test hub 102, with numerous BLUETOOTH® radios 104, transfer BLUETOOTH® audio to and from numerous DUTs 106. Typically, the DUTs are positioned 3 to 9 feet away from the test hub. As such, each BLUETOOTH® radio will increase transmit power to the maximum value in order for the paired device to receive the signal within the optimal receive range (called the Golden Range) in agreement with the BLUETOOTH® specification. Inside test hub 102, all the BLUETOOTH® radios 104 will be inches from each other. For example, each conventional test hub includes many antennas, a number of transceivers, a number of cables and an interface processor. Since the antennas are placed within inches of each other the potential for mutual interference is very high.

As such, systems for monitoring audio quality of clustered wireless devices are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, systems for monitoring audio quality of clustered devices are presented including: a number of wireless communication devices that are physically clustered; a number of audio interface modules (AIM) each electronically paired with each of the number of wireless communication devices to form an AIM/device pair, where the number of AIMs each receives and transmits wireless audio transmissions from each of the paired number of wireless communication devices; a data bus hub electronically coupled with the number of AIMs; and an electronic computing device for receiving and analyzing data associated with the wireless audio transmissions. In some embodiments, wireless audio transmissions are either a narrowband transmission or a wideband transmission. In some embodiments, the wideband transmission is a WiFi audio transmission and the narrowband transmission is a BLUETOOTH® transmission. In some embodiments, the AIMs include: a BLUETOOTH® module for receiving and transmitting BLUETOOTH® audio transmissions from the paired wireless communication device; a USB input for receiving diagnostic data from the paired wireless communication device; and an AIM data hub for receiving and transmitting BLUETOOTH® audio data corresponding with the BLUETOOTH® audio transmissions and the diagnostic data, where the BLUETOOTH® audio data and the diagnostic data are aligned. In some embodiments, the wireless communication device and AIM of each AIM/Device pair are physically proximate to one another at a first distance of approximately less than one wavelength, and each AIM/Device pair is physically separated from one another by a second distance of approximately greater than one wavelength. In some embodiments, the wireless communication device, the AIM, or the wireless communication device coupled with the AIM are at least partially enclosed by a tuned frequency absorbing material to reduce interference from adjacent audio wireless transmissions while allowing non-audio wireless frequencies to pass to the wireless device.

In other embodiments, methods for monitoring audio quality of clustered wireless devices are presented including: providing a system for monitoring audio quality of clustered devices; initiating a call on one of the number of wireless communication devices; applying an operational parameter on the wireless communication device associated with the call; optimizing the operational parameter; and analyzing audio associated with the call. In some embodiments, for a Bluetooth interface, optimizing the operational parameter includes: adjusting a Golden Range of the AIM to force the paired wireless communication device associated with the call to a selected transmit power. In some embodiments, optimizing the operational parameter includes: adjusting a transmission power range of the AIM to limit an optimal power of the paired wireless communication device associated with the call to achieve an optimal high quality and low interference testing result. In some embodiments, optimizing the operational parameter includes: selecting a frequency hopping sequence or algorithm optimized for the clustered devices to minimize interference. In some embodiments, optimizing the operational parameter includes: selecting a transmission band for the AIM using a band selective wireless audio interface to minimize interference. In some embodiments, the wireless audio transmissions are time synchronized to minimize interference. In some embodiments, methods further include post-processing audio data corresponding with the wireless audio transmission based on data signal quality of the audio data. In some embodiments, methods further include determining whether the optimizing the operational parameter is effective by measuring a noise floor or a received signal strength indicator (RSSI) to determine a noise level; and comparing the noise level with the audio.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

As noted above, conventional test hubs that place devices and antennas within inches of each other has a high potential for mutual interference. The following table is provided to illustrate the problem with operating BLUETOOTH® devices in close proximity:

TABLE 1

| Nodes | Probability of NO collisions |
|---|---|
| 4 | 93% |
| 8 | 84% |
| 12 | 76% |
| 16 | 68% |

As may be seen, the probability of NO collisions is reduced as the number of devices is increased. In other words, the higher the number of devices, the more likely a collision will occur as a result of mutual inference.

Figure 2:
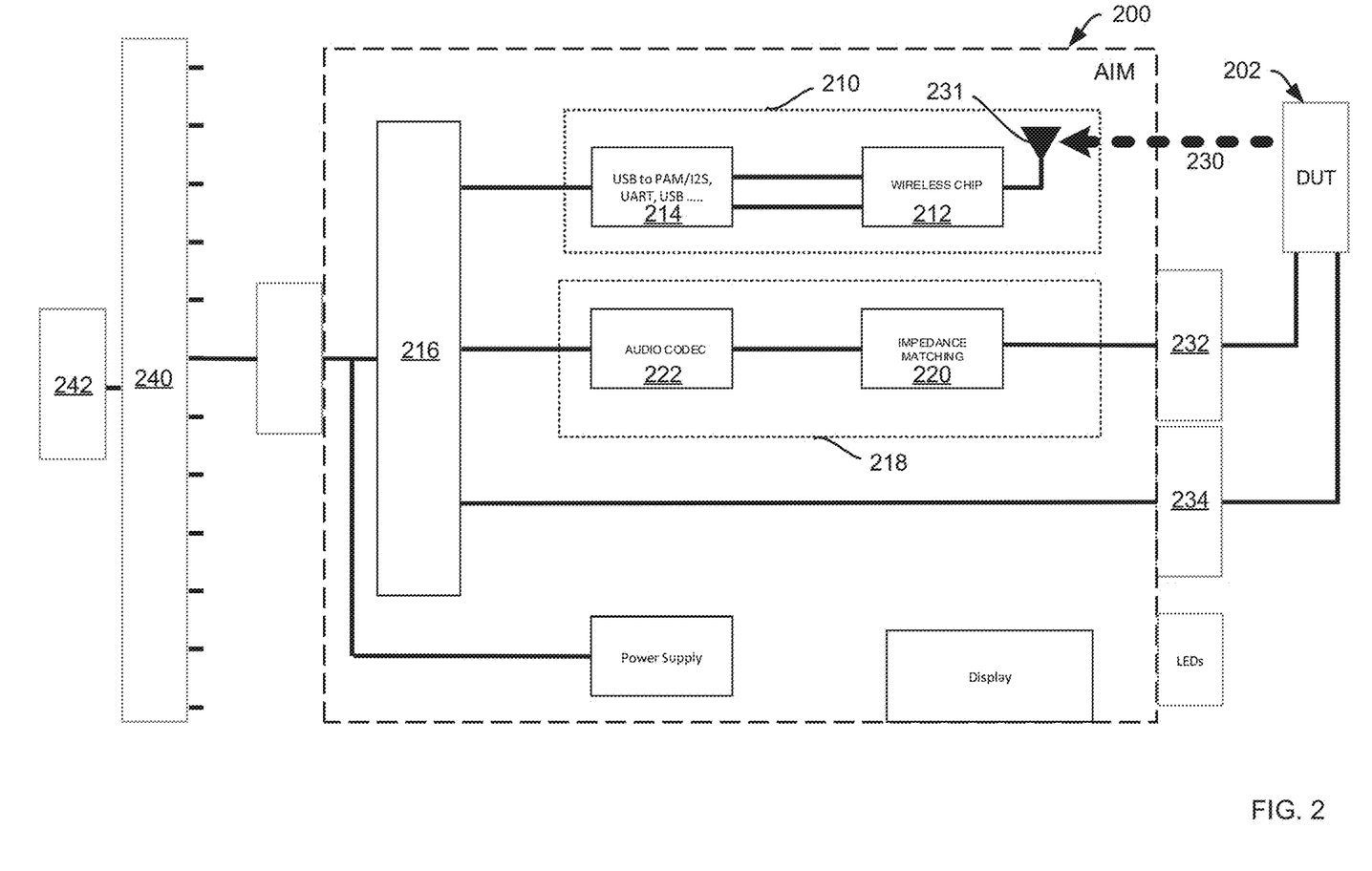
FIG. 2 is an illustrative representation an audio interface module (AIM) paired with a device under test (DUT) in accordance with embodiments of the present invention.

FIG. 2 is an illustrative representation an audio interface module (AIM) 200 electronically paired with a device under test (DUT) 202 to form an AIM/DUT pair in accordance with embodiments of the present invention. As utilized herein, the term DUT may be used to describe any wireless communication device known in the art without limitation. In embodiments, AIM 200 is configured to receive and transmit wireless audio transmissions from DUT 202 as indicated by line 230. In embodiments, wireless audio transmissions are received by an AIM antenna 231 configured to direct transmissions toward the paired wireless communication device and to limit transmissions from other wireless communication devices. In general, AIM 200 includes a wireless module 210, which includes a wireless chip 212 and USB conversion chip 214 in order to convert wireless transmissions to a suitable data format. Wireless audio data corresponding with the wireless transmissions is received by AIM data hub 216 and transmitted to data bus hub 240 for analysis on an electronic computing device 242. In embodiments, the data bus hub is a USB hub.

In embodiments, wireless modules are configured to receive both narrowband and wideband transmissions. In a wideband transmission embodiment, wireless module 210 is configured as a WIFI module that receives and transmits WIFI audio transmissions. In a narrowband transmission embodiment, wireless module 210 is configured as a BLUETOOTH® module that receives and transmits BLUETOOTH® audio transmissions.

Further illustrated is data input 234 that receives diagnostic data corresponding with the wireless audio transmissions from DUT 202. Diagnostic data is received by AIM data hub 216 and transmitted to data bus hub 240 for analysis on an electronic computing device such as laptop 242. In embodiments, wireless audio data and diagnostic data are aligned so that meaningful analysis of the audio may be achieved. In some embodiments, data input is a USB input. In some embodiments, AIM data hub 216 is configured to received wired audio transmissions received via jack 232 and processed by wired audio module 218. Wired audio module 218 includes impedance matching circuitry 220 and audio codec 222. Embodiments employing wired audio provide for devices not having wireless audio capability.

Figure 3:
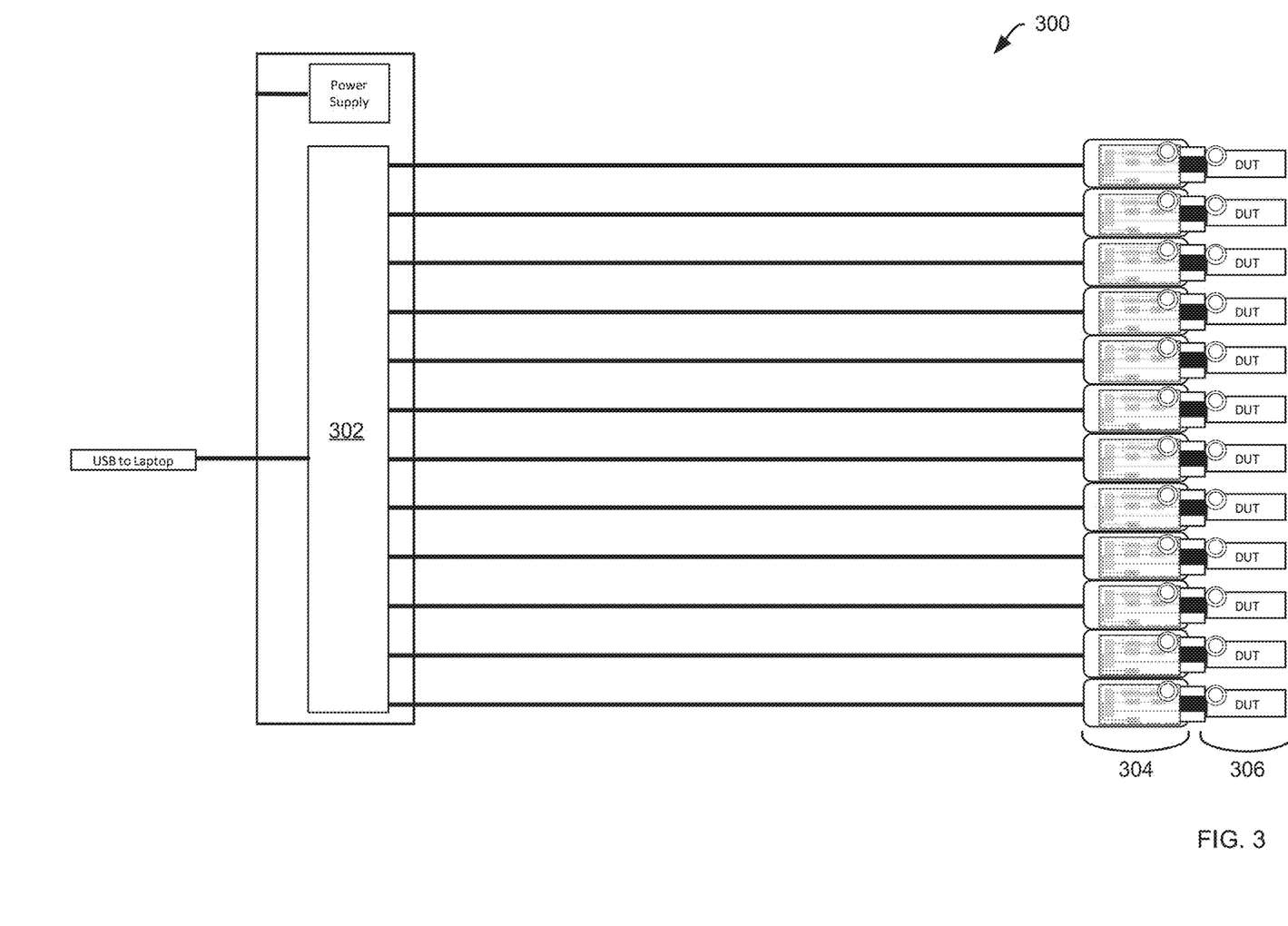
FIG. 3 is an illustrative representation of a system for monitoring audio quality of clustered wireless devices in accordance with embodiments of the present invention.

The proposed architecture minimizes the degradation of multiple wireless audio tests running simultaneously in close proximity (i.e. a van). FIG. 3 is an illustrative representation of a system 300 for monitoring audio quality of clustered wireless devices in accordance with embodiments of the present invention. As illustrated, AIMs 304 are positioned in close proximity with the DUTs 306. These pairings are physically separated from test hub 302. Since the AIM/DUT pairs are physical close to each other in the illustrated configuration, their proximity takes advantage of the BLUETOOTH® protocol that turns down transmit power based on the received signal level of each paired device. A lower transmit signal from each DUT and AIM means a lower interference signal received by DUTs and AIM not intended for the signal.

Figure 4:
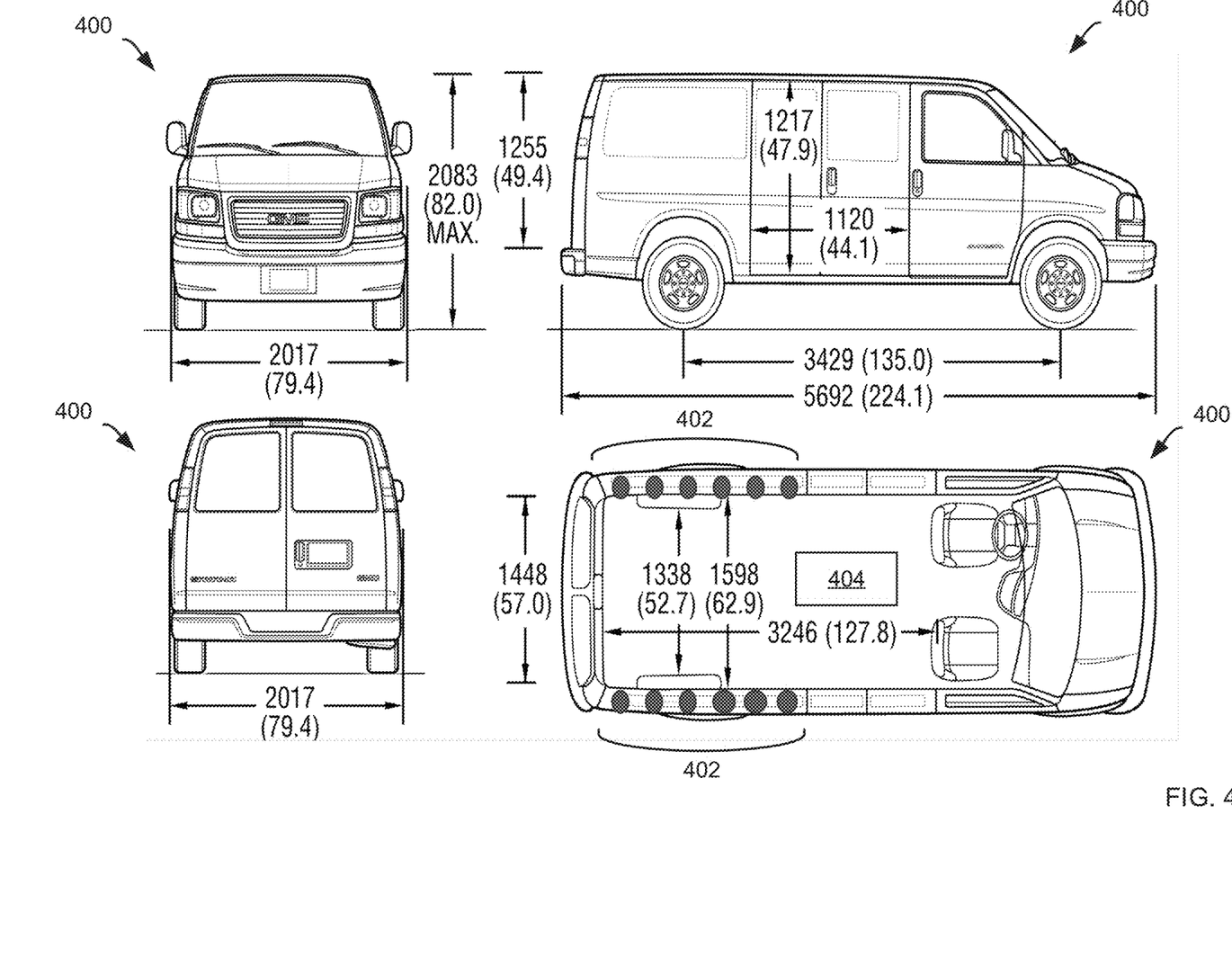
FIG. 4 is an illustrative representation of an installed system for monitoring audio quality of clustered wireless devices in accordance with embodiments of the present invention.

FIG. 4 is an illustrative representation of an installed system for monitoring audio quality of clustered wireless devices in accordance with embodiments of the present invention. As illustrated, AIM/DUT pairs 402 may be clustered on either side of van 400 with the test hub 404 being located away from the AIM/DUT pairs 402.

Figure 5:
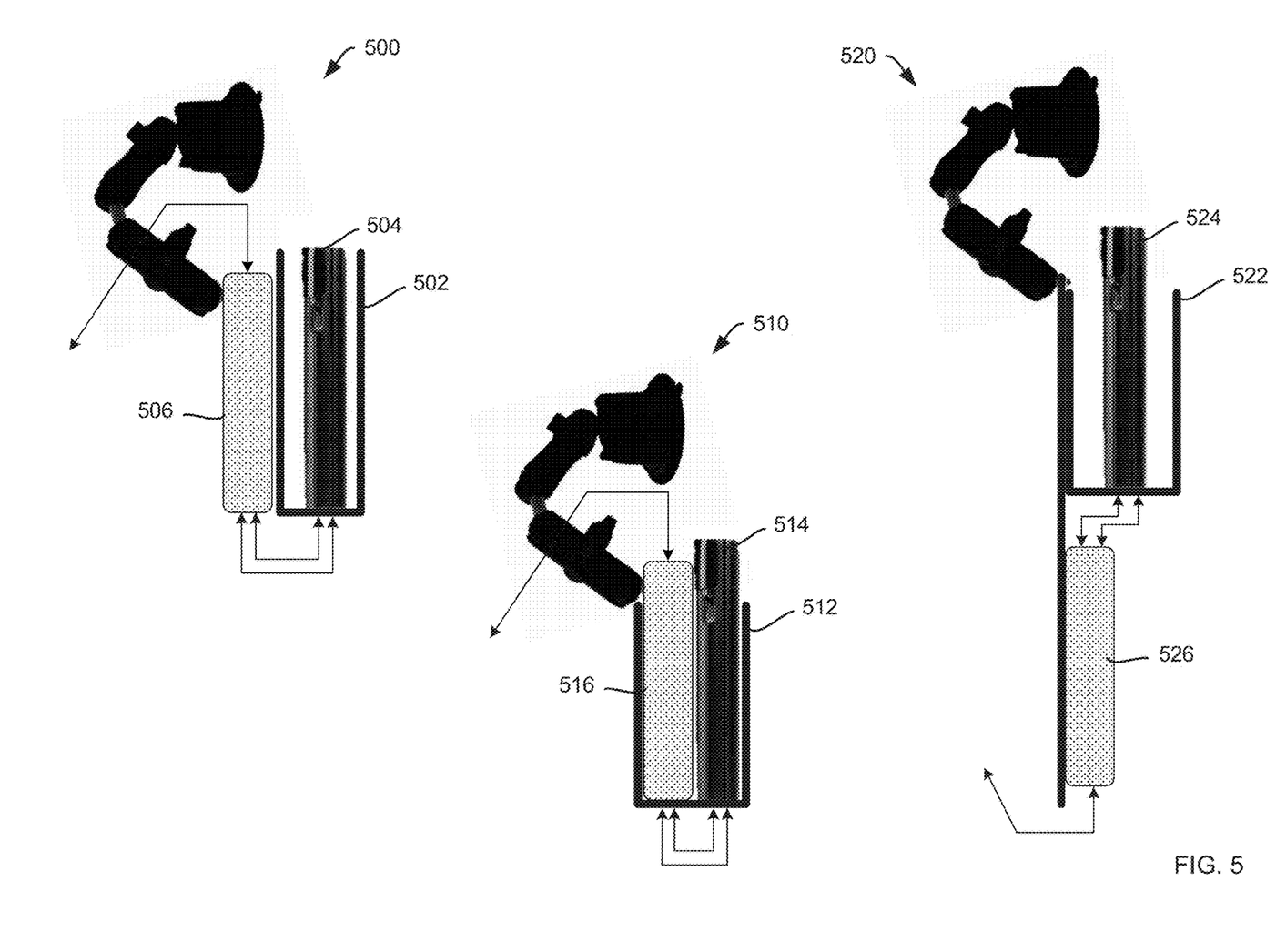
FIG. 5 is an illustrative representation of various AIM/DUT pairs in accordance with embodiments of the present invention.

In addition, to taking advantage of the BLUETOOTH® protocol, the present system isolates each AIM/DUT pair using radio frequency (RF) absorbing materials. FIG. 5 is an illustrative representation of various AIM/DUT pairs in accordance with embodiments of the present invention. In particular AIM/DUT pair 500 illustrates pouch 502 that at least partially encloses DUT 504 keeping the paired AIM and DUT physical proximate to one another while keeping other AIM/DUT pairs physically separate. In embodiments, pouches are manufactured from a tuned frequency absorbing material to reduce interference from adjacent audio wireless transmissions while allowing non-audio wireless frequencies to pass to the wireless device. As illustrated, AIM 506 is located outside of and adjacent to pouch 502.

Further illustrated is AIM/DUT pair 510 and pouch 512 that at least partially encloses DUT 514 and AIM 516 keeping the paired AIM and DUT physical proximate to one another while keeping other AIM/DUT pairs physically separate. In embodiments, pouches are manufactured from a tuned frequency absorbing material to reduce interference from adjacent audio wireless transmissions while allowing non-audio wireless frequencies to pass to the wireless device. As illustrated, AIM 516 is located inside pouch 512 with DUT 514.

Still further illustrated is AIM/DUT pair 520 and pouch 522 that at least partially encloses DUT 524 keeping the paired AIM and DUT physical proximate to one another while keeping other AIM/DUT pairs physically separate. In embodiments, pouches are manufactured from a tuned frequency absorbing material to reduce interference from adjacent audio wireless transmissions while allowing non-audio wireless frequencies to pass to the wireless device. As illustrated, AIM 526 is located outside of and below pouch 522.

In embodiments, the DUT and the AIM pair are physically separated by a distance of approximately less than one wavelength and DUT/AIM pairs are physically separated by a distance of approximately greater than one wavelength, where a wavelength is defined as the distance between successive crests of an electromagnetic wave propagated by the DUT.

In other embodiments, the DUT and the AIM pair are physically separated by a distance of approximately less than two wavelengths and DUT/AIM pairs are physically separated by a distance of approximately greater than two wavelengths, where a wavelength is defined as the distance between successive crests of an electromagnetic wave propagated by the DUT.

In some embodiments, a cradle may be utilized to secure each of the AIMs in close proximity with its paired wireless communication device. A cradle is a structured form of the pouch and manufactured from a tuned frequency absorbing material to reduce interference from adjacent audio wireless transmissions while allowing non-audio wireless frequencies to pass to the wireless device.

Test Data

Figure 6:
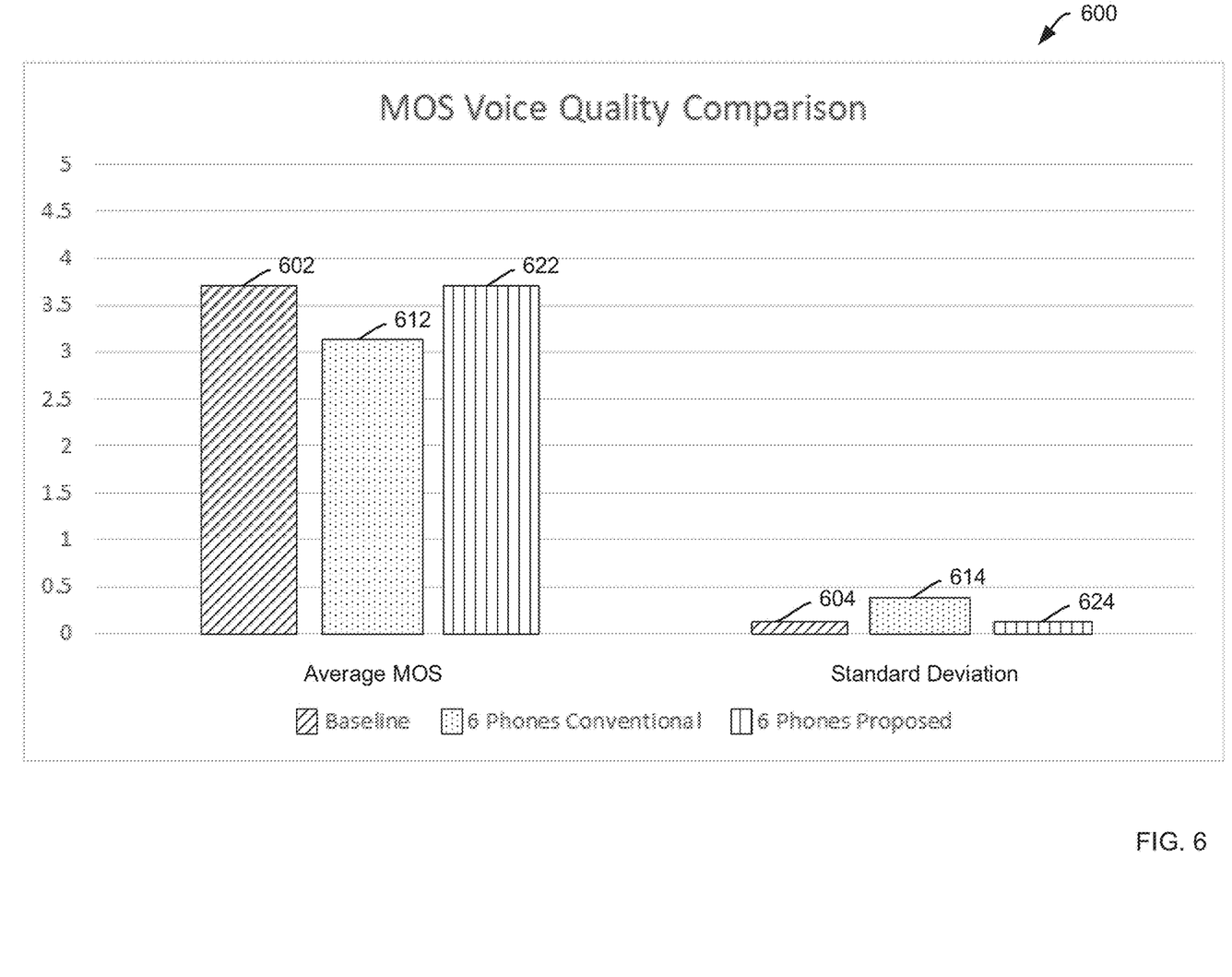
FIG. 6 is a graphical comparison of voice quality in accordance with embodiments of the present invention.

The following test data is tabulated below and illustrated in FIG. 6.

TABLE 2

| Audio Quality | 2 phones isolated Baseline | 6 phones Conventional Architecture | 6 phones Proposed Architecture |
| --- | --- | --- | --- |
| Average MOS Score | 3.71* | 3.11 | 3.70 |
| Standard Deviation | 0.11 | 0.38 | 0.12 |

*Perfect Audio Quality = 5.0

A baseline test was taken using two wireless communication devices (DUT) each paired with two different AIMs in accordance with embodiments provided herein. The paired AIM/DUTs were physically separated from one another to minimize interference between pairs. This baseline measurement represents the best-case results for separated AIM/DUT pairs. The average Mean Opinion Score (MOS) for audio quality was 3.71 (602) and the standard deviation was 0.11 (604) as tabulated above in Table 2 and illustrated in FIG. 6.

In a conventional architecture test, six phones were tested using a system as illustrated in FIG. 1. The average MOS for audio quality was 3.11 (612) and the standard deviation was 0.38 (614) as tabulated above in Table 2 and illustrated in FIG. 6. As such, under conventional systems significant degradation of audio quality and consistency was observed.

In a proposed architecture test, six phones were tested using a system as illustrated in FIG. 3. The average MOS was 3.70 (622) and the standard deviation was 0.12 (624) as tabulated above in Table 2 and illustrated in FIG. 6. As such, under embodiments disclosed herein and without being bound by theory, audio quality similar to the baseline test was observed.

Software Control Methods

In addition to the physical configurations disclosed for embodiments above, at least some software methods may be utilized to reduce interference when using systems provided herein.

Figure 7:
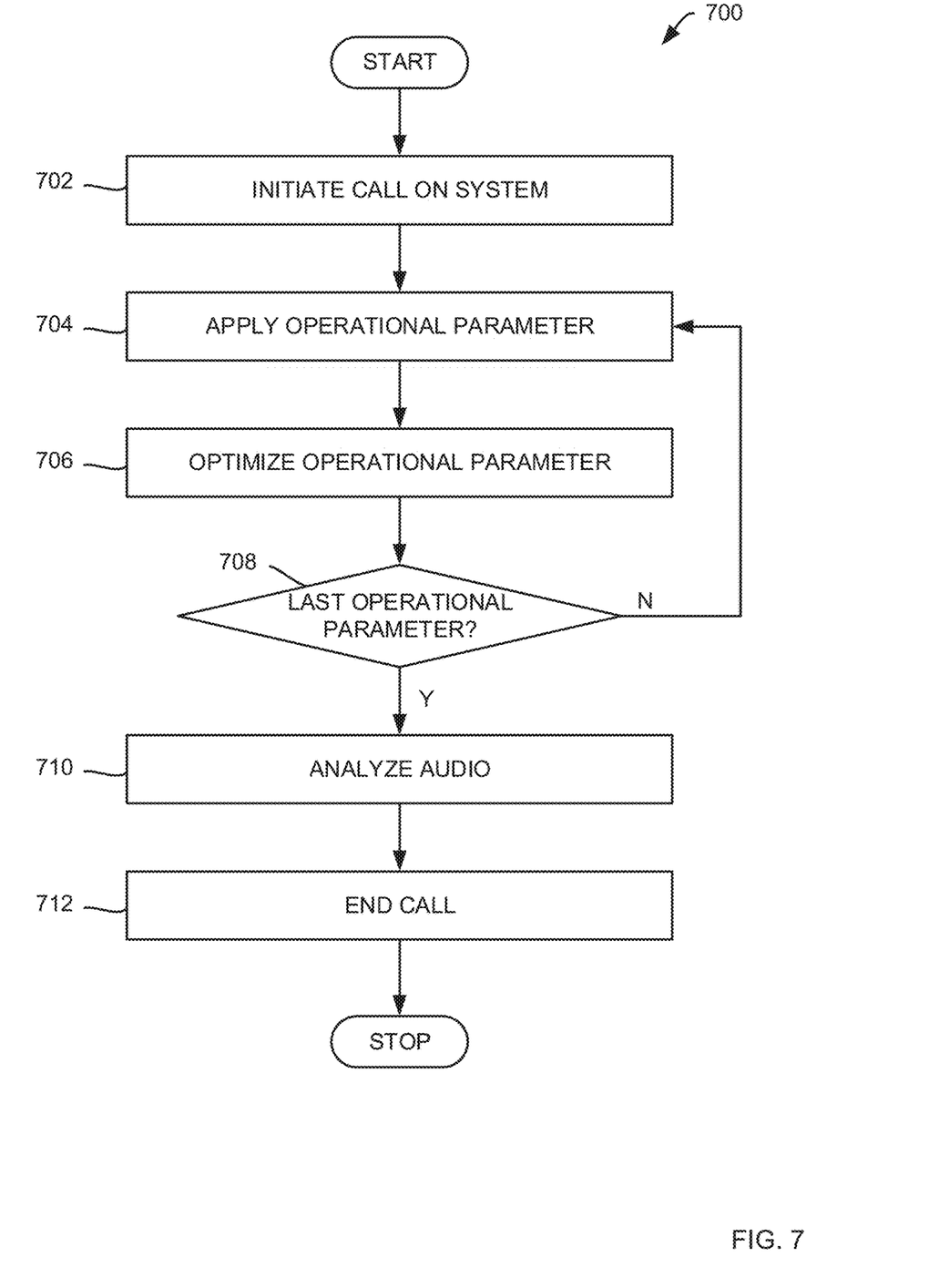
FIG. 7 is an illustrative flowchart of methods for monitoring audio quality of clustered wireless devices in accordance with embodiments of the present invention.

FIG. 7 is an illustrative flowchart 700 of methods for monitoring audio quality of clustered wireless devices in accordance with embodiments of the present invention. As disclosed above, systems of hardware are provided to minimize interference between clustered communication devices. In addition to physical placement and isolation, methods of software control may be utilized to minimize interference in clustered systems.

As such, at a first step 702, the method initiates a call on any of the wireless communication devices or DUTs. Typically, system embodiments will be installed aboard a moving vehicle, such as a van for example. Calls are initiated by the method in order to determine audio quality at various locations. Calls may be initiated based on any number of criteria such as, for example, time interval, location, proximity to an object, and randomly. In some embodiments, calls may be timed so that only a selected number of calls are made on the system at the same time. For example, software that time syncs the phones (like TDM) so that only one pair is transmitting at a time or some small subset of phones are transmitting at the same time. This particular method may be useful in legacy systems that do not employ systems disclosed herein. At a next step, the method applies an operational parameter to the DUT associated with the call. In embodiments, operational parameters include: Golden Range of the AIM, transmission power range of the AIM, frequency hopping sequence or algorithm for the DUT, and transmission band selection for the AIM. These operational parameters may be selected in any order without limitation. At a next step 706, the method optimizes the operational parameter. Utilizing the listed operational parameters, the method adjusts the operational parameters as follows:

For a Bluetooth interface, adjusting the Golden Range of the AIM to force the DUT (i.e. the paired wireless communication device) associated with the call to a desired transmit power.

Adjusting the transmission power range of the AIM to limit an optimal power of the DUT associated with the call to achieve an optimal high quality and low interference testing result.

Selecting a frequency hopping sequence or algorithm optimized for the clustered devices to minimize interference. For example, if N set of devices are tested and M orthogonal hopping sequences are used then the N devices should never interfere if there are N×M frequencies. For example, if two paired devices each use 20 frequencies to hop then if there are 40 frequencies, those two paired devices would never interfere with each other since they never would occupy the same frequency.

Selecting a transmission band for the AIM using a band selective wireless audio interface to minimize interference.

The method continues to a step 708 to determine whether all operational parameters have been adjusted. If the method determines at a step 708 that not all operational parameters have been adjusted, the method returns to a step 704 to apply another operational parameter. In this manner, the method adjusts all available operational parameters for each call initiated. If the method determines at a step 708 that all operational parameters have been adjusted, the method continues to a step 710 to analyze the audio associated with the call. Analyzing the audio includes determining whether the optimizing the operational parameter is effective by measuring MOS Score, a noise floor or a received signal strength indicator (RSSI) to determine a noise level; and comparing the noise level with the audio level or comparing MOS Scores. Measuring the noise floor, received signal strength indication (RSSI), or other parameters that would determine the "noise" created by unwanted signals during the "down time" of the BLUETOOTH® voice measurements may be desirable in embodiments. For example, between sending and receiving the voice data there is typically a small amount of time left idle. The AIM may be configured to make a measurement during this time to determine if noise/interference is being generated by a device not in the system. In some embodiments, analyzing further includes post-processing audio data corresponding with the wireless audio transmission based on data signal quality of the audio data. Once analysis is complete, the method ends the call at a step 712 and subsequently, the method ends.

In addition to methods provided, additional parameters may be adjusted outside of the call. For example, in one embodiment, the AIM utilizes beamforming to adaptively maximize transmissions to and from the paired wireless communication device while minimizing transmissions to and from other wireless communication devices. In another embodiment, the AIMs are clock synchronized to minimize wireless transmission interference. In still another embodiment, an Adaptive Frequency Hopping technique may not be optimal for testing a large number of DUTs in a small area using BLUETOOTH®. In those cases, the system can configure the AIM device to force the system to revert to the old Frequency Hopping algorithm to improve the test performance. In addition, Time synchronizing the BLUETOOTH® chips to eliminate collisions may further reduce interference in embodiments. Thus, if all BLUETOOTH® devices are synched to the same clock source when they select their own hopping sequence, they should not interfere with each other. This may work in equally well in system embodiments and legacy systems.

Thus, a combination of techniques disclosed herein may be utilized to reduce interference in embodiments.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A system for monitoring audio quality of clustered devices comprising:
   a plurality of wireless communication devices that are physically clustered;

a plurality of audio interface modules (AIM) each electronically paired with each of the plurality of wireless communication devices to form an AIM/device pair, wherein the plurality of AIMs each receives and transmits wireless audio transmissions from each of the paired plurality of wireless communication devices, and wherein the plurality of AIMs further receives and transmits wired audio transmissions from the plurality of wireless communication devices;

a data bus hub electronically coupled with the plurality of AIMs; and an electronic computing device for receiving and analyzing data associated with the wireless audio transmissions.

2. The system of claim 1, wherein wireless audio transmissions are either a narrowband transmission or a wideband transmission.

3. The system of claim 2, wherein the wideband transmission is a WiFi audio transmission.

4. The system of claim 2, wherein the narrowband transmission is a BLUETOOTH® transmission.

5. The system of claim 2, wherein each of the plurality of AIMs comprise:

a wireless module for receiving and transmitting wireless audio transmissions from the paired wireless communication device;

a data input for receiving diagnostic data from the paired wireless communication device; and an AIM data hub for receiving and transmitting audio data corresponding with the wireless audio transmissions and the diagnostic data, wherein the audio data and the diagnostic data are aligned.

6. The system of claim 3, wherein each of the plurality of AIMs comprise:

a WIFI module for receiving and transmitting WIFI audio transmissions from the paired wireless communication device;

a USB input for receiving diagnostic data from the paired wireless communication device; and an AIM data hub for receiving and transmitting WIFI audio data corresponding with the WIFI audio transmissions and the diagnostic data, wherein the WIFI audio data and the diagnostic data are aligned.

7. The system of claim 4, wherein each of the plurality of AIMs comprise:

a BLUETOOTH® module for receiving and transmitting BLUETOOTH® audio transmissions from the paired wireless communication device;

a USB input for receiving diagnostic data from the paired wireless communication device; and an AIM data hub for receiving and transmitting BLUETOOTH® audio data corresponding with the BLUETOOTH® audio transmissions and the diagnostic data, wherein the BLUETOOTH® audio data and the diagnostic data are aligned.

8. The system of claim 1, wherein the wireless communication device and AIM of each AIM/Device pair are physically proximate to one another at a first distance of approximately less than one wavelength, and wherein each AIM/Device pair is physically separated from one another by a second distance of approximately greater than one wavelength.

9. The system of claim 8 further comprising:

a plurality of cradles for securing each of the plurality of AIMs in close proximity with the paired wireless communication device.

10. The system of claim 1, wherein the wireless communication device and AIM of each AIM/Device pair are physically proximate to one another at a first distance of approximately less than at least two wavelengths, and wherein each AIM/Device pair is physically separated from one another by a second distance of approximately greater than two wavelengths.

11. The system of claim 1, wherein one of: the wireless communication device, the AIM, or a combination of the wireless communication device coupled with the AIM are at least partially enclosed by a tuned frequency absorbing material to reduce interference from adjacent audio wireless transmissions while allowing non-audio wireless frequencies to pass to the wireless device.

12. The system of claim 1, wherein each AIM further comprises an AIM antenna configured to direct transmissions toward the paired wireless communication device and to limit transmissions from other wireless communication devices.

13. The system of claim 1, wherein each AIM utilizes beamforming to adaptively maximize transmissions to and from the paired wireless communication device while minimizing transmissions to and from other wireless communication devices.

14. The system of claim 1, wherein the plurality of AIMs are clock synchronized to minimize wireless transmission interference.

15. A method for monitoring audio quality of clustered wireless devices comprising:

providing a system for monitoring audio quality of clustered devices, the system comprising:

a plurality of wireless communication devices that are physically clustered;

a plurality of audio interface modules (AIMs) each electronically paired with each of the plurality of wireless communication devices, wherein the plurality of AIMs each receives and transmits wireless audio transmissions from each of the paired plurality of wireless communication devices;

a data bus hub electronically coupled with the plurality of AIMs; and an electronic computing device for receiving and analyzing data associated with the wireless audio transmissions;

initiating a call on one of the plurality of wireless communication devices;

applying an operational parameter on the wireless communication device associated with the call;

optimizing the operational parameter; and analyzing audio associated with the call.

16. The method of claim 15, wherein for a Bluetooth interface, optimizing the operational parameter comprises:

adjusting a Golden Range of the AIM to force the paired wireless communication device associated with the call to a selected transmit power.

17. The method of claim 15, wherein optimizing the operational parameter comprises:

adjusting a transmission power range of the AIM to limit an optimal power of the paired wireless communication device associated with the call to achieve an optimal high quality and low interference testing result.

18. The method of claim 15, wherein optimizing the operational parameter comprises:

selecting a frequency hopping sequence or algorithm optimized for the clustered devices to minimize interference.

19. The method of claim 15, wherein optimizing the operational parameter comprises:
  selecting a transmission band for the AIM using a band selective wireless audio interface to minimize interference.

20. The method of claim 15, wherein the wireless audio transmissions are time synchronized to minimize interference.

21. The method of claim 15, further comprising:
  post-processing audio data corresponding with the wireless audio transmission based on data signal quality of the audio data.

22. The method of claim 15, further comprising:
  determining whether the optimizing the operational parameter is effective by measuring a noise floor or a received signal strength indicator (RSSI) to determine a noise level; and
  comparing the noise level with the audio.

23. A system for monitoring audio quality of clustered devices comprising:
  a plurality of wireless communication devices that are physically clustered;
  a plurality of audio interface modules (AIM) each electronically paired with each of the plurality of wireless communication devices to form an AIM/device pair, wherein the plurality of AIMs each receives and transmits wireless audio transmissions from each of the paired plurality of wireless communication devices;
  a data bus hub electronically coupled with the plurality of AIMs wherein the data bus hub is a universal serial bus (USB) hub; and
  an electronic computing device for receiving and analyzing data associated with the wireless audio transmissions.

* * * * *